US011507617B2

United States Patent
Alexander et al.

(10) Patent No.: US 11,507,617 B2
(45) Date of Patent: Nov. 22, 2022

(54) UNSUPERVISED DIALOGUE TOPIC EXTRACTION

(71) Applicant: salesforce.com, inc., San Francisco, CA (US)

(72) Inventors: Zachary Alexander, Berkeley, CA (US); Na Cheng, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 341 days.

(21) Appl. No.: 16/685,933

(22) Filed: Nov. 15, 2019

(65) Prior Publication Data
US 2021/0149949 A1 May 20, 2021

(51) Int. Cl.
*G06F 16/61* (2019.01)
*G06F 40/30* (2020.01)
*G06F 7/08* (2006.01)

(52) U.S. Cl.
CPC ............... *G06F 16/61* (2019.01); *G06F 7/08* (2013.01); *G06F 40/30* (2020.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Thu N Nguyen
(74) *Attorney, Agent, or Firm* — Weaver Austin Villeneuve & Sampson LLP

(57) ABSTRACT

Disclosed are some implementations of systems, apparatus, methods and computer program products for extracting topics from a corpus of exchanges. The system generates vector representations of utterances of an entity common to the exchanges and uses the vector representations to cluster the utterances. The system labels the clusters and uses the labeled clusters to generate an exchange label sequence for each of the exchanges, where each exchange label sequence corresponds to a sequence of utterances generated by the entity. The system processes the exchange label sequences to generate one or more subsets of the utterances, where each of the subsets corresponds to a particular topic.

20 Claims, 16 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,460 B1* | 5/2002 | Gruen ................ H04L 12/1827 709/204 |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | Fresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshavsky et al. |
| 2011/0247051 A1 | 10/2011 | Bulumulla et al. |
| 2011/0295603 A1* | 12/2011 | Meisel .................... G10L 15/32 704/E17.001 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0127327 A1* | 5/2015 | Bacchiani ............... G10L 15/26 704/202 |
| 2015/0142596 A1 | 5/2015 | Jakobson et al. |
| 2015/0172563 A1 | 6/2015 | Jakobson et al. |
| 2018/0341632 A1 | 11/2018 | Akkiraju et al. |
| 2019/0102078 A1 | 4/2019 | Bhatt et al. |
| 2019/0147853 A1 | 5/2019 | Gunasekara et al. |
| 2019/0294673 A1* | 9/2019 | Sapugay .................. G06N 5/04 |
| 2019/0325897 A1* | 10/2019 | Liu ..................... H04M 3/5175 |
| 2019/0362021 A1 | 11/2019 | Balduino et al. |
| 2020/0004878 A1* | 1/2020 | Beaumont ............. G06F 16/685 |
| 2020/0097496 A1 | 3/2020 | Alexander et al. |
| 2020/0097544 A1 | 3/2020 | Alexander et al. |
| 2020/0097563 A1 | 3/2020 | Alexander et al. |
| 2020/0097608 A1 | 3/2020 | Xiu et al. |
| 2020/0142959 A1 | 5/2020 | Mallinar et al. |
| 2020/0193265 A1 | 6/2020 | Hill et al. |
| 2021/0149921 A1 | 5/2021 | Alexander et al. |
| 2021/0149933 A1 | 5/2021 | Chang et al. |
| 2021/0149964 A1 | 5/2021 | Wang et al. |
| 2021/0150146 A1 | 5/2021 | Alexander et al. |

OTHER PUBLICATIONS

U.S. Appl. No. 16/685,926, filed Nov. 15, 2019, Alexander et al.

U.S. Final office action dated Mar. 30, 2022, in U.S. Appl. No. 16/685,926.

U.S. Office Action dated Dec. 16, 2021 issued in U.S. Appl. No. 16/685,926.

\* cited by examiner

200

Customer: Utterance 1
Agent: Utterance 1
Customer: Utterance 2
Agent: Utterance 2
Customer: Utterance 3
Agent: Utterance 3
Customer: Utterance 4
Agent: Utterance 4
Customer: Utterance 5
Agent: Utterance 5

*Figure 2*

Greeting — 400

1: Hello Colleen! Thank you for contacting Acme today! My name is Konner, how may I help you with your order?
2: Hello Maureen! Thank you for contacting Acme today! My name is Kailyn, how may I help you?
3: Hello Terisa! Thank you for contacting Acme today! My name is Shelly, how may I help you with your return?
4: Hello John! Thank you for contacting Acme! My name is Shelly, how may I help you with your account today?
5: Hello Jennifer! Thank you for contacting Acme today! My name is Arnav, what product would you like to know more about?

Extended Greeting — 410

1: Hi,
2: I haven't heard from you. Are you still with me?
3: Good Evening!
4: Hi Patricia :)
5: Thank you for the order number.
6: I apologize, your previous conversation was disconnected. I will be happy to assist you from here.

Confirm Problem

1: I will be glad to check and help you with the information.
2: I understand that you are concerned about the shipping status. Let me check your account and help you with the current shipping status.
3: I can definitely assist you with the status of your order. Let me quickly access your account and help you with the details.
4: I'm sorry to hear that you have not received the order. I'll check on your account and help you with the delivery information.
5: I appreciate your interest in shopping with us. I'll definitely look into this and help you with appropriate information on this product.
6: I'm sorry to hear that you need to cancel the order. Let me see what I can do to help you with cancelling the order.
7: Sure, I will find that information for you right away!
8: I'm sorry to hear that you need to cancel the order. Let me see what I can do to help you with cancellation of the order.
9: I'm sorry to hear that you need to return an item however, I'll be glad to check and help you with the return.
10: I will be glad to help you with that.

*Figure 4B*

Collect Data

1: May I have the order number please?
2: May I have the item number that you wish to order? The item number is just below the price description on the product page.
3: Thank you for the order number.
4: Could you please help me with the order number?
5: May I know the reason for Cancellation?
6: Can I have the order number, please? This is just to locate your account.
7: I am here to help you.
8: You are welcome!
9: Do you mind holding 1-2 minutes while I research or process your request?
10: Would you mind holding while I check on the tracking information?

Confirm Data ← 440

1: I haven't heard from you. Are you still with me?
2: Thank you.
3: Thanks for your time. I appreciate your patience.
4: Thanks you for the order number.
5: Thank you for confirming.
6: Thank you for the information.
7: I will go ahead and cancel the membership and refund $19.95 as in-store credit to your account.
8: Thank you! Let me check and help you.
9: Thanks you for your time.

Discuss Resolution ← 450

1: Usually, this credit will be reflected on your account within 3-5 business days. However, you can contact your bank to know the exact posting timeframe.
2: You might see a pending charge on the account, which is a just pre-authorization charge.
3: I have initiated a trace with the carrier to locate the package. It may take up to 1 - 2 business days for the process to be completed.
4: May I try to cancel the order for you and send the confirmation to your Email?
5: If we're able to locate the item, it will be delivered to you as soon as possible. If not, we'll help you with a replacement.
6: I can try to cancel the order and then you can reorder it with the correct shipping address.
7: Once the order is placed, we do not have the option to edit or make any changes. Fortunately, the order is not yet processed.
8: Is the email address registered on your account good to send the return label?
9: You will be contacted via phone or email once the trace is completed with a resolution.
10: Thank you.

*Figure 4D*

Inform Resolution ← 460

1: Once your order ships, you will be notified via your email address which we have on file with the tracking details and the carrier name. So that you can track your order and see the scheduled delivery date.
2: I am sorry to tell you that orders cannot be cancelled or changed once they have been accepted and sent to our warehouse.
3: Once the order is accepted by our warehouse, it will take 1-10 business days to ship out and 1-6 business days to deliver from the ship date.
4: This process takes anywhere from 1-2 business days from the order date.
5: The item will be delivered to you within 3-6 business days from the order date.
6: As an exception, I can send a message to our partner to check if they can stop the shipment. This again is a probability, we don't guarantee for now. Would you like me to do that for you?
7: Usually, orders will likely be handed off to USPS or FedEx for the final delivery. This means a higher possibility for Saturday deliveries! Rest assured your package is absolutely safe and it's currently in transit to your shipping address.
8: The delivery estimate was just a tentative date within which we expected the package to be delivered, subject to the carrier operations. Sorry, it was not an assured delivery date.
9: I see that this item takes 1-2 business days to ship and 3-6 business days to deliver the item from the order date.
10: The status of Pending or In Process on your invoice means that your order has been received at our warehouse and is in the process of being packed and shipped.

Closing ← 470

1: If you have any other questions or need further assistance, please do not hesitate to contact us again. Thank you for contacting Acme and have a great day!
2: I haven't heard from you. Are you still with me?
3: Thank you for contacting Acme. Have a great day!
4: You are welcome!
5: Is the contact information on your account good to contact you?
6: Thank you.
7: Is there anything else I can help you with?
8: Have I addressed all your concerns?
9: For now, was I able to take care of all your questions and concerns today?

*Figure 4E*

Damaged Item

| | Score | Count | Utterance |
|---|---|---|---|
| 0 | 7.20 | 56 | Please keep the item and the package for up to 10 business days, while the carrier completes the investigation and ... |
| 1 | 6.60 | 35 | If the carrier doesn't inspect the merchandise by 03/27/2019, you can disprose the item. |
| 2 | 5.38 | 56 | Once the claim is set, they may request to inspect the damaged item. |
| 3 | 4.22 | 44 | Apologies that your order arrived damaged. I'll quickly set up a claim with the carrier. |
| 4 | 3.81 | 22 | I'll initiate a refund right away and you'll receive it within 1 – 2 business days. You'll also receive an email co... |
| 5 | 3.73 | 45 | I'll go ahead and create a replacement right away? The replacement order will be shipped within 1 – 2 business days... |
| 6 | 3.72 | 57 | The credit will reflect in your account as per the posting time frame established by your bank. |
| 7 | 2.87 | 66 | Oh! I'm sorry to hear that you received a damaged item. Let me look into this and I'll take care of it for you. |
| 8 | 2.44 | 929 | Thank you for confirming. |
| 9 | 2.38 | 39 | Once the order is shipped, you'll receive an email with the tracking details. |
| 10 | 2.22 | 10 | I'll quickly set up a claim with the carrier. |
| 11 | 1.86 | 19 | May I know the condition of the package? |
| 12 | 1.55 | 99 | Oh! I'm sorry to hear that you received a damaged item. I apologize for the any kind of inconvenience caused to you... |
| 13 | 1.38 | 77 | Would you like a replacement or refund? |
| 14 | 1.26 | 12 | If nobody visits to inspect the merchandise by 11/09/201X, you can disprose the item. |

*Figure 5A*

UNSUPERVISED DIALOGUE TOPIC EXTRACTION

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with automated processing of digital exchanges. More specifically, this patent document discloses techniques for analyzing transcripts of digital exchanges to identify a sequential or topical structure.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, question-answer systems, electronic mail (email) systems, and instant messaging systems, by way of example, in a cloud computing environment.

A number of software applications enable users to communicate with one another digitally. One common scenario is an online chat, which offers the ability to communicate in real-time using a transmission of messages from a sender to a receiver. An online chat can include point-to-point communications between a sender and a receiver, as well as multicast communications from one sender to many receivers. Messages may be sent via a number of services including text, voice, and video.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 2 shows a representation of an online exchange that is processed, in accordance with some implementations FIGS. 3A and 3B each shows a diagram of an example of a representation of a state flow structure extracted from a corpus of exchanges, in accordance with some implementations.

FIGS. 4A-4E show examples of states extracted from a corpus of exchanges, in accordance with some implementations.

FIGS. 5A and 5B each shows an example of a topic extracted from a corpus of exchanges, in accordance with some implementations.

DETAILED DESCRIPTION

Figure 1:
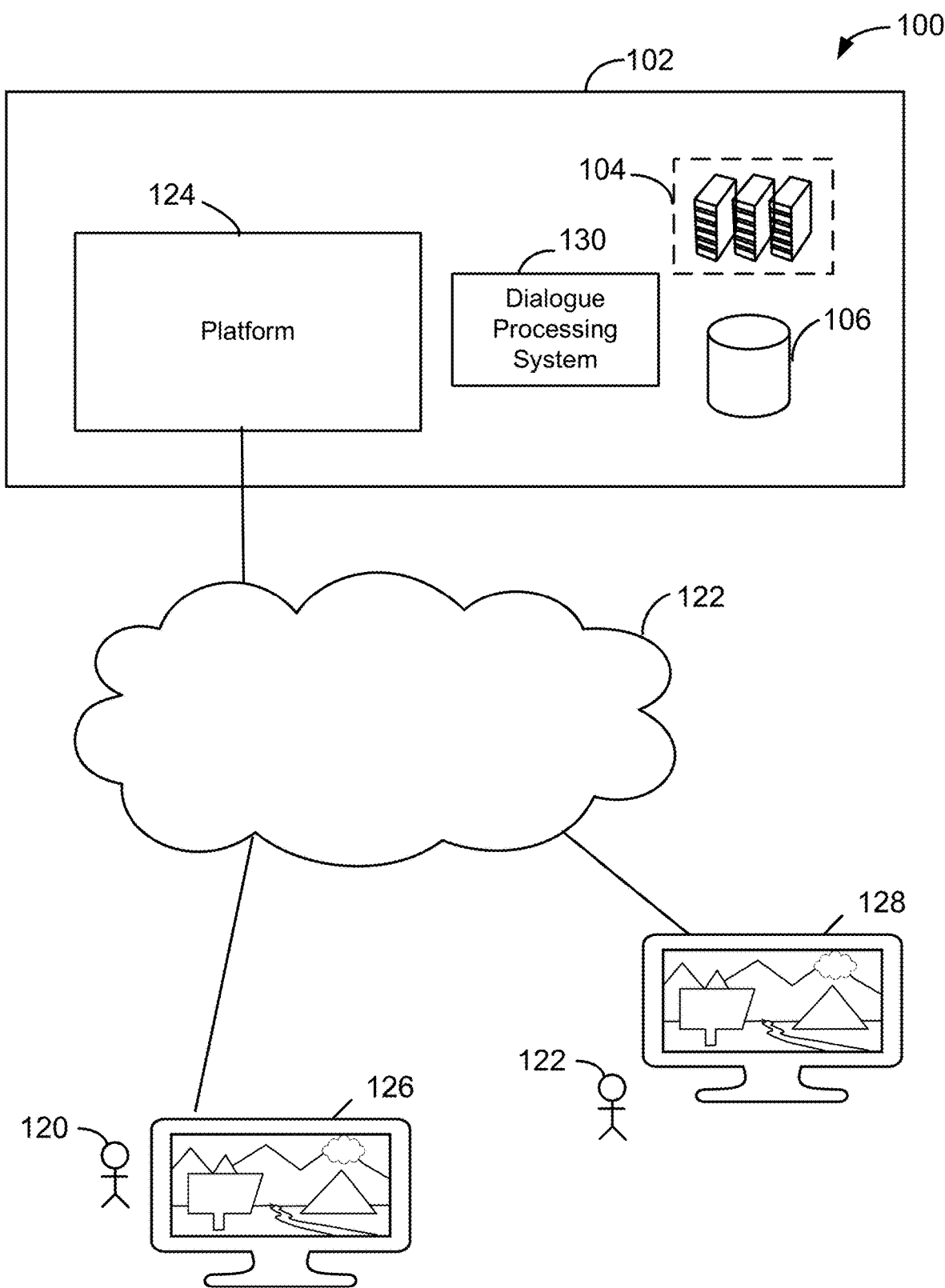
FIG. 1 shows a system diagram of an example of a system 100 in which a dialogue processing system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for processing a corpus of digital exchanges to ascertain state flow structures or topics from the exchanges. Processing of the exchanges can include processing of utterances generated or transmitted by a single entity that is common to the exchanges.

In some implementations, the corpus of digital exchanges includes a plurality of exchanges. Each of the exchanges can be represented by utterances transmitted between two or more entities. In some implementations, utterances generated or transmitted by a single entity common to the exchanges are processed without processing utterances generated or transmitted by other entities that are party to one or more of the exchanges. In the following description, it is assumed that the utterances that are processed are generated or transmitted by a single entity common to the exchanges.

In some implementations, the corpus of digital exchanges represents communications transmitted over a network such as the Internet. The communications can be transmitted via a software service or program, which can be provided by a web site. The corpus of digital exchanges can include transcripts of online chats between an entity common to the exchanges and one or more other entities. For example, the entity common to the exchanges can include an "agent entity," while the other entities can include "customer" entities.

In some implementations, the exchanges represent communications between representative(s) associated with a web site and other individuals over a period of time. The representative(s) can be treated as a single entity that is common to the exchanges. In the following examples, the representative(s) will be referred to as an agent, while other individuals that are party to one or more of the exchanges will be referred to as a customer.

In some implementations, the corpus of digital exchanges is processed to extract at least one state flow structure from the exchanges. Each state flow can include a sequence of states, where each of the states is represented by a corresponding set of utterances.

In some implementations, vector representations of utterances within the exchanges are generated and the utterances are clustered using the vector representations. The clusters are labeled (e.g., numerically) and the labeled clusters are used to generate an exchange label sequence for each of the exchanges. The exchange label sequences are then processed to generate a state flow structure. The state flow structure can be comprised of a plurality of states, where each of the states is represented by a set of utterances. Each state may be labeled based upon the corresponding set of utterances.

In some implementations, agent utterances within customer-agent chat transcripts are analyzed to extract a common structure or flow within the various agent-customer exchanges. To define states within the flow, an administrator may label the states based upon the representative utterances for each state. Using the extracted flow(s), an administrator can have more thorough knowledge of the conversation paths that typically occur, the states within these paths, and the utterances that an agent would typically generate within each of these states. The administrator can use these extracted state flows and utterances representative of each state to design a chat bot, as well as test an existing chat bot.

In some implementations, a corpus of digital exchanges is processed to extract topics from the exchanges. Each topic can be represented by a set of utterances.

In some implementations, vector representations of utterances within the exchanges are generated and used to cluster the utterances. The clusters are labeled (e.g., numerically) and the labeled clusters are used to generate an exchange label sequence for each of the exchanges. The exchange label sequences are then processed to generate one or more subset(s) of the utterances, where each subset corresponds to a particular topic. Each topic may be labeled based upon the corresponding set of utterances.

In some implementations, agent utterances within customer-agent chat transcripts are analyzed to extract topics that are covered within the various agent-customer exchanges. An administrator may review the set of agent utterances corresponding to each topic, and label the set of utterances with an appropriate topic label. Using the topics and representative utterances, either independently or in combination with one or more state flows, an administrator can design a bot, as well as test an existing bot.

Today, many businesses use "chat bots" to take the place of human agents in exchanges with customers. A chat bot is an autonomous software program that can interact with other systems or users. Typically, a chat bot is designed to respond or behave in a specific way in a specific context, such as a player in an adventure game or an agent in a customer service application.

Designing a chat bot in an environment such as a customer service environment can be challenging for a number of reasons. First, it can be difficult to identify the topics that are likely to be raised by a customer on a given day. Second, it can be difficult to predict the likely path that a given exchange will take. As a result, a system designer can spend a significant amount of time reviewing past exchanges in an effort to design a chat bot or test an existing chat bot.

In accordance with some implementations, utterances within a corpus of exchanges are processed to generate a state flow structure and/or topics. The state flow and/or topics may be used to facilitate the design of a chat bot and/or testing of a chat bot. Therefore, exchanges may be processed to facilitate the design and/or testing of an automated system configured to respond or behave in a particular business, role, and/or context.

By way of illustration, Zachary is an employee at an organization, Acme Construction, Inc. Zachary is manager of the Customer Services Department and has been asked to design a chat bot to handle the company's customer chat service. Zachary would like to identify the most common issues that customers raise and the types of statements that an agent would typically generate while conversing with customers for each of the issues. He would also like to familiarize himself with the typical communication flow that transpires while an agent is conversing with a customer.

Zachary runs a dialogue processing system that processes transcripts of all of the customer service exchanges over the past year. The dialogue processing system generates a report that identifies a common flow and a sequence of states within the flow. Within the report, each of the states is represented by a set of agent utterances. Zachary reviews the agent utterances categorized in each state and assigns a state label to each of the states. Specifically, the first state is represented by agent utterances during an initial Greeting state, the second state is represented by agent utterances during a Collect Data state, the third state is represented by agent utterances during a Discuss Resolution State, and the fourth state is represented by agent utterances during a Closing state. In addition, the report identifies two topics, each of which represented by a corresponding set of agent utterances. Zachary reviews the agent utterances categorized in each topic and assigns topic labels, Damaged Item and Missing Item, to the respective topics. Zachary then designs a bot to handle damaged and missing items using the flow identified by the report.

FIG. 1 shows a system diagram of an example of a system 100 in which a dialogue processing system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store transcripts of exchanges, utterances of one party to the exchanges, reports that have been generated, state flows, states and corresponding agent utterances, topics, and/or utterances pertaining to the topics, which may be generated, updated, accessed, and/or processed as described in further detail below.

In some implementations, system 102 is configured to store user profiles/user accounts associated with users of system 102. Information maintained in a user account of a user can include or indicate a user email address and credentials of the user. For example, credentials of the user can include a username and password. The information can also include the name of the user. In addition, the information can indicate a role of the user and associated permissions. For example, an employee may have access to question answer services, while an administrator may have access to chat transcripts and dialogue processing services, as described herein.

Client devices 126, 128 may be in communication with system 102 via network 122. More particularly, client devices 126, 128 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at salesforce.com®. By logging into this account, the user can access online chat services offered to customers. In addition, an administrator that has logged into their account can access the various dialogue processing services provided by servers 104.

In some implementations, users 120, 122 of client devices 126, 128 can access online chat services by logging into system 102 via platform 124. More particularly, client devices 126, 128 can log into system 102 via an application programming interface (API) or via a graphical user interface (GUI) using credentials of corresponding users 120, 122, respectively.

In some implementations, users 120, 122 can submit questions via a customer chat service provided by system 102. Customer chat service communicates with users 120, 122 to answer their questions or provide a resolution to issues that they raise in their communications. Customer chat service participates in exchanges with various users. In some instances, customer chat service includes live agents that communicate with users. IN other instances, customer chat services may implement a chat bot that autonomously communicates with users that initiate exchanges with the customer chat services. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, system 102 records a transcript of each exchange in one or more log files stored in storage medium 106. Dialogue processing system 130 analyzes transcripts of exchanges automatically or in response to a user-initiated command. As a result of the analysis, dialogue processing system 130 may generate a report pertaining to state flow(s) and/or topics identified within the exchanges. The report may be accessed by an individual such as user 122 via a client device such as device 128 to generate or test a bot. For example, system 102 may provide a user such as an administrative user 122 access to chat transcripts, dialogue processing system 130, and/or reports generated by dialogue processing system 130 via client device 128 according to their corresponding role. In some implementations, system 102 is configured to automatically generate or test a bot using the state flow(s) generated by dialogue processing system 130 and/or topic categories generated by dialogue processing system 130.

FIG. 2 shows a representation of an online exchange that is processed, in accordance with some implementations. In this example, the exchange includes ten utterances, where five of the utterances are transmitted via a software service from a client device of a customer to a client device of an agent over a network, and five of the utterances are transmitted via the software service from the client device of the agent to the client device of the customer over the network. Therefore, in this example, for each utterance that is generated or transmitted by the agent, there is a corresponding utterance that is received by the agent from the customer.

Transcripts of a plurality of exchanges may be stored in one or more data objects such as one or more databases. In other implementations, only agent-side utterances are stored without storing customer-side utterances. This may be performed, for example, to retain customer confidentiality. For example, a database may include a plurality of entries, where each of the entries includes text representing a corresponding utterance. Each of the entries may correspond to an agent utterance and/or a customer utterance.

As another example, utterances may be stored in a text file or other form of representation. Dialogue processing system 130 may parse the file or representation to extract utterances for a single entity common to the exchanges. For example, for the exchange shown in FIG. 2, dialogue processing system 130 may extract and process agent utterances 1-5 without extracting or processing customer utterances 1-5.

In some implementations, dialogue processing system 130 generates one or more state flows from the utterances that it processes. Each state flow or associated representation may be provided for rendering via a display of a client device or printing via a printer. In addition, a state flow or representation thereof may be stored for subsequent retrieval. A data structure may store one or more state flows or representations thereof.

Figure 3A:
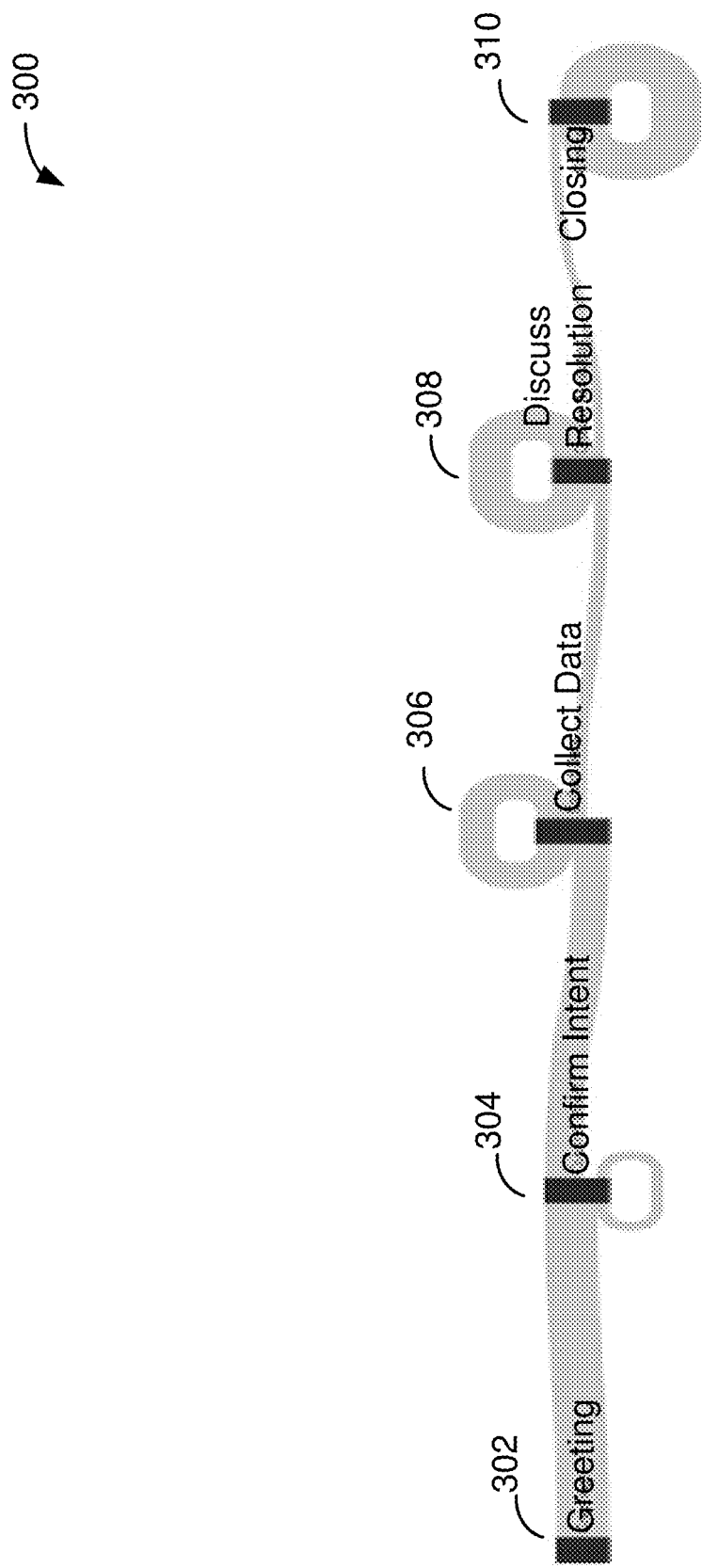
Figure 3B:
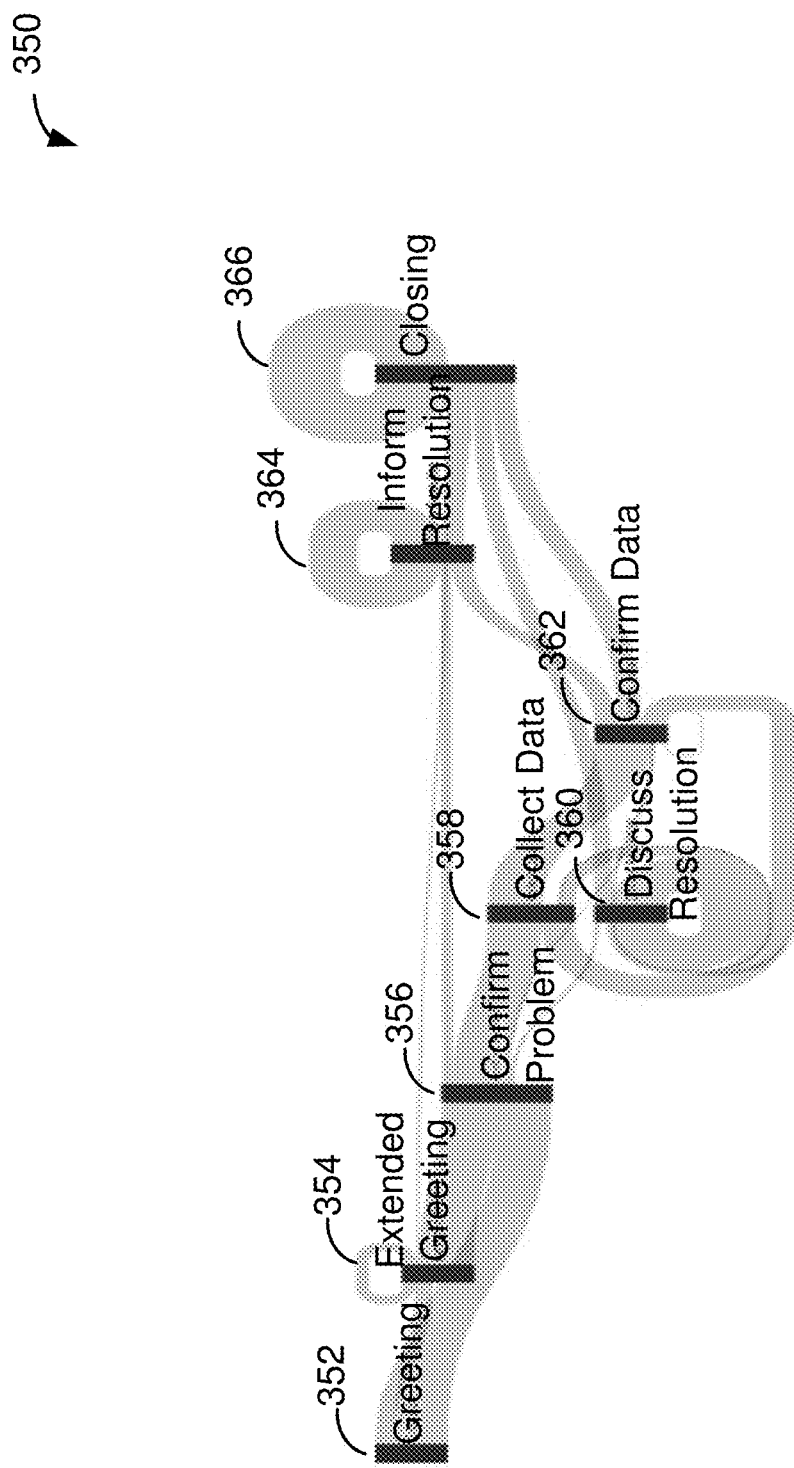

FIGS. 3A and 3B each shows a diagram of an example of a representation of a state flow structure extracted from a corpus of exchanges, in accordance with some implementations. In FIG. 3A, state flow 300 includes five states, represented by graphical elements 302, 304, 306, 308, 310. In some implementations, each state is further identified by a corresponding label. As will be described in further detail below, state labels may be automatically generated or user-generated. In this example, the first state 302 is identified as a Greeting, the second state 304 is identified as Confirm Intent, the third state 306 is identified as Collect Data, the fourth state 308 is identified as Discuss Resolution, and the fifth state 310 is identified as Closing.

States may be represented by a particular graphical shape, element, and/or color. In this example, states are represented as blue rectangles. A link between the states may be represented by a line or other graphical element that indicates the order or sequence in which the states occur. In FIG. 3A, a grey path is used to illustrate the relationship or connection between the different states within a state flow.

Additional graphical elements may represent the length of time expended or number of utterances transmitted by a particular entity or exchanged between entities for a particular state. More particularly, the length of time or number of utterances may be represented by a loop or other graphical element. In this example, a grey loop presented for states 304, 306, 308, and 310 indicates that the agent generates and transmits multiple utterances during the corresponding state. As shown in this example, the number of utterances generated and transmitted by the agent in each of states 306, 308, and 310 is greater than that generated and transmitted in each of states 302 and 304.

In FIG. 3B, state flow 350 includes eight states, represented by graphical elements 352-366. In this example, the first state 352 is identified as a Greeting, the second state 354 is identified as Extended Greeting, the third state 356 is identified as Confirm Problem, the fourth state 358 is identified as Collect Data, the fifth state 360 is identified as Discuss Resolution, the sixth state 362 is identified as Confirm Data, the seventh state 364 is identified as Inform Resolution, and the eighth state 366 is identified as Closing. In this example, the size of the loops presented for states 354, 360, 364, and 366 may correlate with the number of utterances generated by the entity (e.g., agent) or exchanged between entities (e.g. agent and customer). For example, the larger loop of the eighth state 366 may indicate that five utterances are generated by the agent while the smaller loop of the second state 354 may indicate that two utterances are generated by the agent.

In the above-described examples, each state flow is provided in the form of a graphical representation. In addition, the flows are represented in an order from left to right. However, these examples are merely illustrative. Therefore, state flows may be provided in text or other forms of representations.

FIGS. 4A-4E show examples of states extracted from a corpus of exchanges, in accordance with some implementations. As shown in FIG. 4A, a Greeting state 400 includes five utterances and Extended Greeting state 410 includes six utterances. In addition, FIG. 4B illustrates a Confirm Problem state 420 that includes ten utterances; FIG. 4C illustrates a Collect Data state 430 that includes ten utterances; FIG. 4D illustrates a Confirm Data state 440 that includes nine utterances and a Discuss Resolution state 450 that includes ten utterances; FIG. 4E illustrates an Inform Resolution state 460 that includes ten utterances and a Closing state 470 that includes nine utterances. In these examples, each of the utterances is generated and transmitted by an agent entity during one of the exchanges.

Figure 5B:
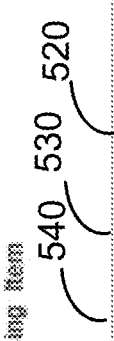

FIGS. 5A-5B each shows an example of a topic extracted from a corpus of exchanges, in accordance with some implementations. Specifically, FIG. 5A illustrates a Damaged Item topic 500, while FIG. 5B illustrates a Missing Item topic 550. The utterances categorized as pertaining to a damaged item include fifteen utterances that were generated and transmitted by an agent entity during at least one of the exchanges. Similarly, the utterances categorized as pertaining to a missing item include fifteen utterances that were generated and transmitted by an agent entity during at least one of the exchanges. Therefore, each topic may be represented by a group or category of utterances generated by an entity during the exchanges.

As shown in these examples, information pertaining to a topic that is generated from the corpus of exchanges can be provided in the form of a report. In these examples, the report is presented in the form of one or more tables. Each table can include, for each utterance within the category, one or more information items. For example, each of a plurality of rows or entries within a table may correspond to a different one of a plurality of utterances, while each of a plurality of columns may correspond to a different one of a plurality of information items.

In some implementations, each of the utterances identified in an entry of the tables of FIGS. 5A and 5B represents a group, category, or "cluster" of utterances. Thus, a given entry within the table may correspond to and represent multiple utterances having the same or similar meaning.

In FIGS. 5A and 5B, each utterance is identified within an Utterance column 520 of the table. In addition, further information items can indicate a frequency with which each of the utterances (or utterances having an equivalent meaning) occurred within the exchanges, as represented by the Count column 530. For example, a value within the Count column 530 can indicate the number of times that the utterance or an utterance having an equivalent meaning occurs within the exchanges. In other words, the Count column 530 can indicate the number of times an utterance within the corresponding cluster occurs within the exchanges. Alternatively, the Count column 530 can indicate the number of utterances within the cluster corresponding to the representative utterance.

In some implementations, an additional information item can indicate a score associated with each of the utterances (or corresponding cluster), as represented by the Score column 540. Specifically, a value within the Score column 540 can indicate the pertinence of a topic to the particular utterance or cluster represented by the utterance. For example, as shown in FIG. 5B, a high score within a first entry of the table may indicate that the topic is more relevant to the corresponding utterance or corresponding cluster than to another utterance or corresponding cluster having a lower score, as represented in a second entry of the table.

Figure 6:
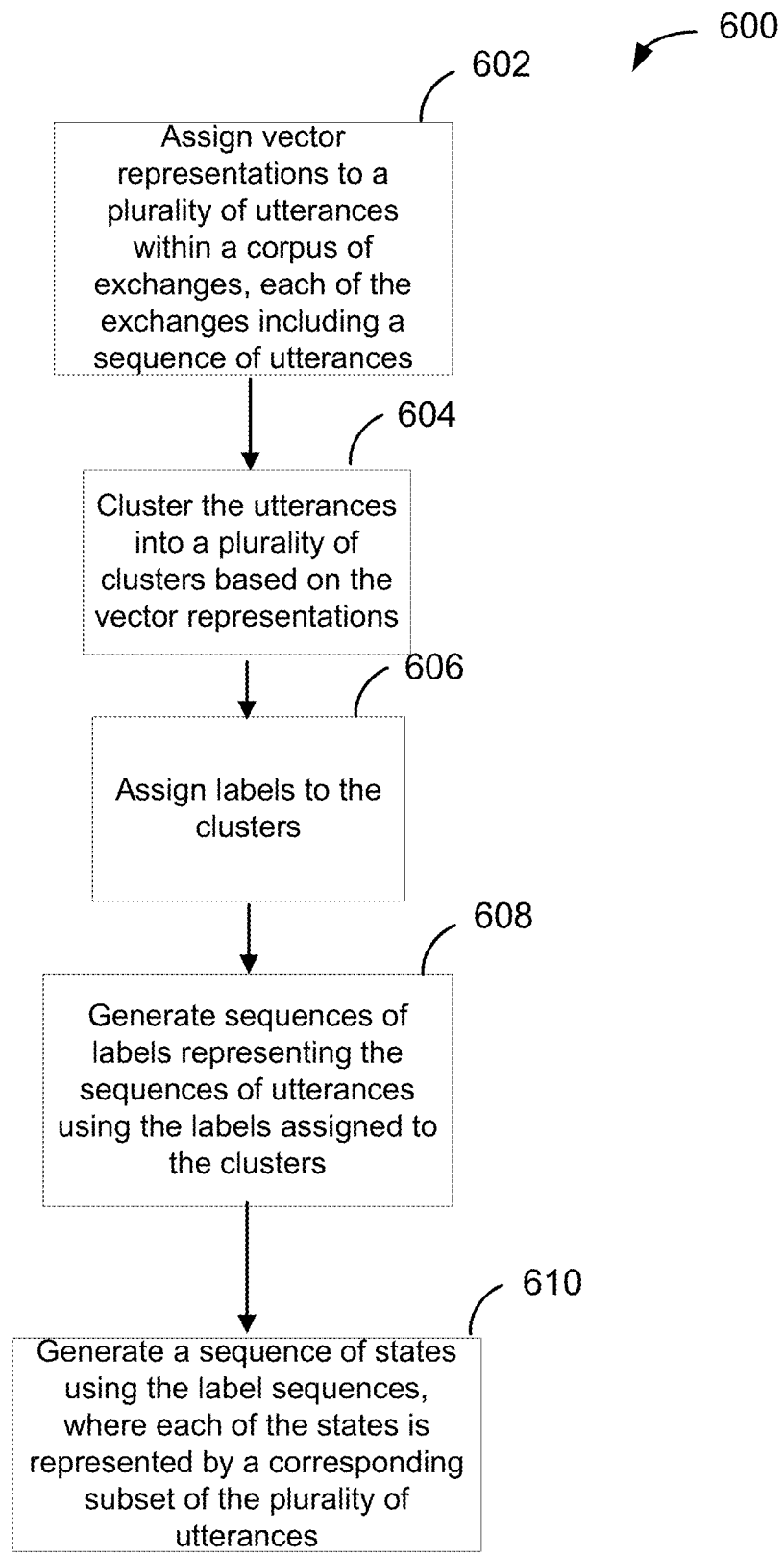
FIG. 6 shows an example of a method 600 for extracting a state flow structure from a corpus of conversations, in accordance with some implementations.

FIG. 6 shows an example of a method 600 for extracting a state flow structure from a corpus of conversations, in accordance with some implementations. To process utterances within a corpus of exchanges, the utterances are represented numerically. Specifically, for each one of a plurality of utterances within a plurality of exchanges, the system assigns a vector representation to the corresponding utterance (602). Each value in a vector may represent a corresponding word in the utterance. This may be accomplished using a product such as a sentence encoder that generates a vector that semantically represents an utterance. Thus, semantically similar utterances will have similar vectors.

Each of the utterances may be generated by a first entity common to the exchanges, where each of the exchanges includes a sequence of utterances generated by the first entity common to the exchanges and transmitted to at least one other entity. Specifically, the first entity can include any individual, process, and/or system that communicates in a particular role within the exchanges. In other words, the first entity can include more than one individual, system, and/or process communicating in the same capacity. For example, the first entity can be an "agent," even though there may be multiple individuals communicating in the role of the agent.

As another example, the first entity can be a "customer," even though the customer will not be the same individual across all of the exchanges. In some implementations, the utterances generated by an agent entity may be processed without processing utterances generated by a customer entity.

The system then clusters the plurality of utterances into a plurality of clusters based, at least in part, on the vector representation assigned to each of the utterances (604). More particularly, the system may form a set of clusters using the agent utterances based, at least in part, on the corresponding vector representations and then generate the plurality of clusters from the set of clusters. For example, the system may form a set of 100 clusters and generate 75 clusters from the initial set of clusters.

In some implementations, the system performs agglomerative clustering to group the utterances based on their similarity. In a specific implementation, the system performs complete-linkage clustering. Specifically, the system may treat each utterance as a single cluster. The system may then generate the plurality of clusters from the set of clusters by iteratively combining one or more pairs of clusters that are "closest" to each other based, at least in part, on a maximum pairwise distance between pairs of vector representations of two different clusters. In other words, the two clusters that are "closest" to each other may be combined, where the closest two clusters are selected based upon the maximum distance between any pair of points from two different clusters. This may be accomplished, for example, by ascertaining a distance between a first vector representing a first agent utterance within a first cluster and a second vector representing a second agent utterance within a second cluster.

The system may sequentially perform the cluster merging process for pairs of clusters. In some implementations, the system may choose to merge two clusters that have a maximum pairwise cosine distance that is less than or equal to a threshold cosine distance. Thus, the system may merge pairs of clusters until it determines that the "closest" pair of clusters has a maximum pairwise cosine distance that is greater than the threshold cosine distance. For example, the threshold cosine distance may be 0.2.

The system may further merge two or more clusters based, at least in part, on a quantity of utterances within individual clusters. In some implementations, the system may preserve the largest N clusters and merge the remaining clusters. More particularly, the system may select a subset of the clusters that represents at least a threshold percentage of the utterances and merge the remaining clusters. For example, the system may preserve the largest N clusters such that 80% of all utterances are covered by the N clusters. The remaining clusters may be merged into a single cluster. Alternatively, the remaining clusters may be eliminated (e.g., not used for further processing of utterances).

The system may then assign to each of the plurality of clusters, a different one of a plurality of labels such that utterances within the cluster are associated with the corresponding label (606). Labels may include alphanumerical labels. For example, each of the N clusters may be labeled $\{1 \ldots N\}$ while the single cluster that has been generated from the merged smaller clusters may be labeled 0. The label 0 may correspond to the designation "Other."

The system may then generate, for each of the exchanges, a corresponding sequence of labels representing the corresponding sequence of utterances based, at least in part, on the labels assigned to the plurality of clusters such that a plurality of exchange label sequences are generated (608).

For example, where an exchange includes a sequence of five agent utterances, the system may generate a corresponding sequence of five labels, where each of the labels is derived from the cluster label of the cluster in which the utterance was categorized. Therefore, each exchange may be represented by a sequence of discrete labels.

The system may generate a state flow including a sequence of a plurality of states using the exchange label sequences such that each of the plurality of states is represented by a different subset of the plurality of utterances (610). The state sequence may be generated in the form of a data structure such as a linked list. More particularly, the system may ascertain a quantity of conversation states to extract and generate the sequence of states according to the quantity of conversation states. For example, the quantity of conversation states may be user-specified, either via an input device or a statically configured value. As another example, the quantity of conversation states may be determined by the system.

In some implementations, the system generates the sequence of states using a model that is fit on the exchange label sequences. For example, the system may fit a multinomial Hidden Markov Model on the exchange label sequences.

After the sequence of states has been generated, each of the states may be labeled based, at least in part, on the corresponding subset of the plurality of utterances. In some implementations, the subsets of the utterances may initially be provided without corresponding labels. A user may subsequently assign a state label (e.g., alphanumeric name) representing the corresponding subset of the utterances to the corresponding state. For example, the user may assign state labels such as Greeting, Extended Greeting, Confirm Problem, Collect Data, Confirm Data, Discuss Resolution, and Inform Resolution, as shown in FIGS. 4A-4E. Alternatively, the system may auto-assign state labels. For example, the system may process a particular utterance subset by identifying commonalities among utterances within the utterance subset. This may be accomplished using mechanisms such as natural language processing, computer-generated models, artificial intelligence, and/or pattern matching. The labeled state sequence may be stored in a data structure such as a linked list. The labeled state sequence may subsequently be provided for rendering or printing. A state flow represents a communication path that can be traversed during an exchange. As described above, a state flow can include a sequence of states. In addition, a state flow can include one or more conditional elements or branches. For example, a conditional element or branch may control which state is entered next. Therefore, a state flow can include one or more possible sequences of states.

In the above-described example, a single state flow is generated. However, this example is merely illustrative. Therefore, the system may generate any number of state flows from the same utterances or corpus of exchanges.

Figure 7:
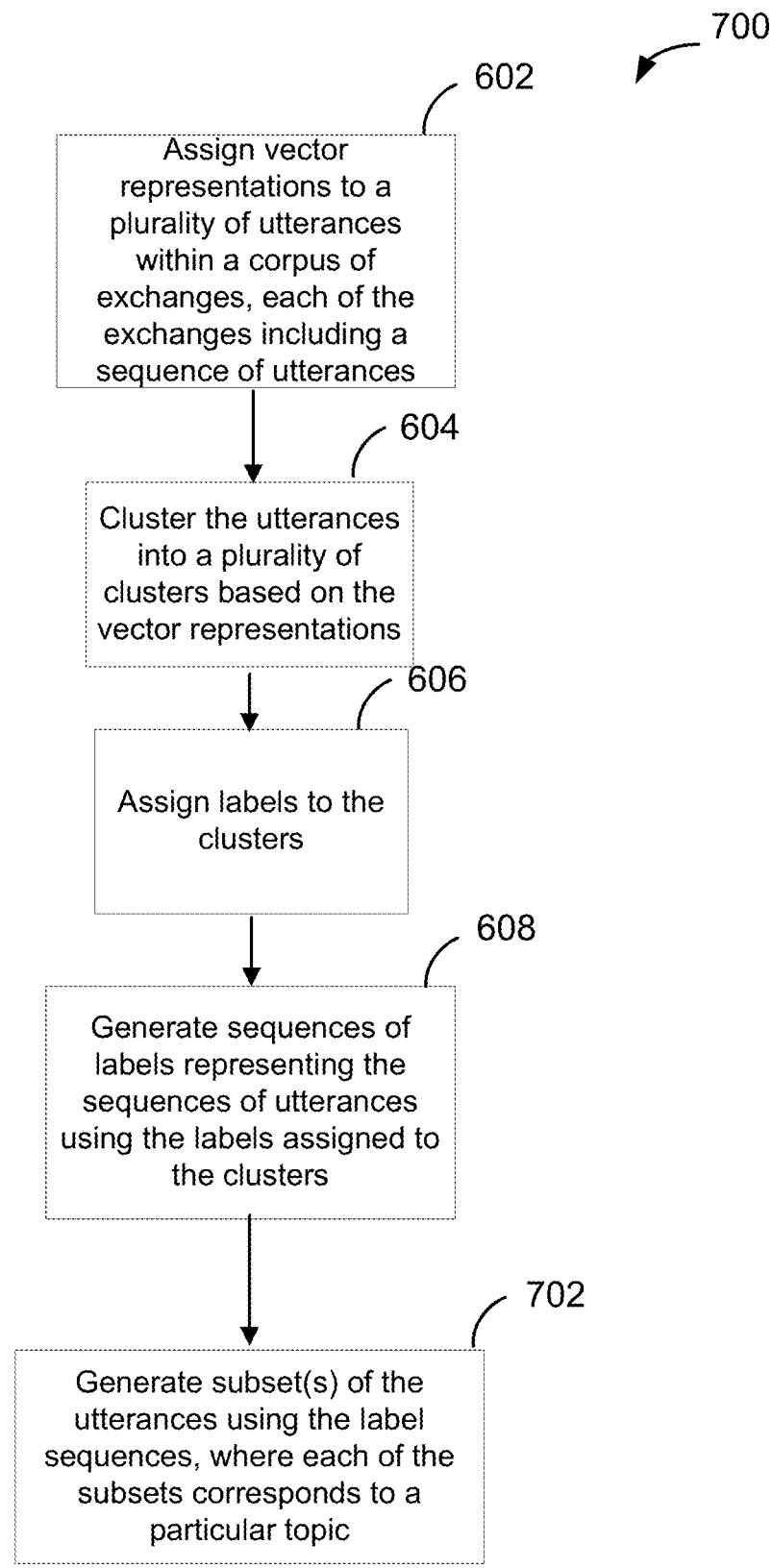
FIG. 7 shows an example of a method 700 for extracting topics from a corpus of conversations, in accordance with some implementations.

In addition to generating a state flow, the system may also identify topics from the utterances extracted from the exchanges. FIG. 7 shows an example of a method 700 for extracting topics from a corpus of conversations, in accordance with some implementations. As shown in FIG. 7, topic extraction may include performing steps 602-608 of FIG. 6, as described above. After the exchange label sequences have been generated, the system may process the exchange label sequences to generate one or more subsets of the utterances, where each of the subsets corresponds to a different topic (702). The utterance subset associated with one topic may overlap the utterance subset associated with another topic. Alternatively, the utterance subsets may be distinct from one another.

In some implementations, the system uses matrices to generate the utterance subset(s) corresponding to the topics. First, the system generates a matrix M representing the exchanges using the exchange label sequences. More particularly, the matrix M may be a n×m co-incidence matrix, where n represents the quantity of exchanges in the plurality of exchanges that have been processed and m represents the quantity of utterance clusters that were generated and processed. In other words, the n rows correspond to n exchanges and the m columns correspond to the clusters of utterances that have been generated in step 606. The quantity of utterance clusters can indicate the number of clusters that together include at least a threshold percentage of the utterances, as described above. For example, m may correspond to the number of clusters that cover 80% of the utterances within the exchanges. The (i, j) entry of the matrix M corresponds to the $i^{th}$ exchange and $j^{th}$ utterance cluster. Where the entry includes a zero, this indicates that an utterance from the $j^{th}$ cluster is not in the $i^{th}$ exchange.

Second, the system factorizes the matrix M such that each topic is represented by a corresponding subset of the plurality of utterances. More particularly, a topic may be represented by one or more utterance clusters, utterances from the pertinent utterance clusters, or utterances representing the utterance clusters. Thus, an utterance subset representing a topic may include a representative utterance from each of these clusters or may include all utterances from these clusters. To simplify reports such as those shown in FIGS. 5A and 5B, a single representative utterance from each relevant cluster may be presented for a given topic.

In some implementations, the system factorizes the matrix M by performing non-negative matrix factorization. The system may factorize the matrix M such that two smaller matrices are generated, as described below. More particularly, the system generates a first matrix, W, and a second matrix, H, that when multiplied, result in the matrix M. After factorizing the matrix M, the matrix M is equivalent to WH, which is the product of matrix W and matrix H, where W is a n×k matrix having n rows and k columns and H is a k×m matrix having k rows and m columns. The variable k represents the number of topics for which utterance subsets are to be generated. Stated another way, variable k represents the number of topics that the system is to identify. The number of topics k may be user specified, system selected, or statically configured.

In accordance with various implementations, the k columns of the matrix W correspond to the topics covered in the corresponding n exchanges, where the n exchanges are mapped to the rows of the matrix W. In other words, each column of the matrix W corresponds to a different one of a plurality of topics. A zero in an (i, j) entry of the matrix W indicates that the $j^{th}$ topic is not covered in the $i^{th}$ exchange, while a non-zero value in the (i, j) entry of the matrix W indicates that the $i^{th}$ topic is covered in the $i^{th}$ exchange. Thus, a row of the matrix W indicates topics of the corresponding $i^{th}$ exchange.

In addition, the k rows of the matrix H correspond to the topics covered in the utterances of the corresponding m clusters, where the m clusters are mapped to the columns of the matrix H. In other words, each row of the matrix H corresponds to a different one of the plurality of topics. A zero in an (i, j) entry of the matrix H indicates that the $i^{th}$ topic is not covered in the utterances of the $j^{th}$ cluster, while a non-zero value in the (i, j) entry of the matrix H indicates that the $i^{th}$ topic is covered in the utterances of the $j^{th}$ cluster. Thus, a column of the matrix H indicates topics covered in the utterances of the corresponding $j^{th}$ cluster.

In some implementations, the non-zero values in the second matrix, matrix H, include scores that indicate the pertinence of each topic to each utterance cluster. For example, for a given row of the matrix H and corresponding topic, the highest score indicates the utterance cluster to which the topic is most pertinent. As another example, for a given column and corresponding utterance cluster, the highest score indicates the topic that is most pertinent to the utterance cluster.

Similarly, the non-zero values in the first matrix, matrix W, may indicate the pertinence of each topic to each exchange. For example, for a given row of the matrix W and corresponding exchange, the highest score indicates the topic that is most pertinent to the exchange. As another example, for a given column of the matrix W and corresponding topic, the highest score indicates the exchange to which the topic is most pertinent.

In some implementations, the system generates a per-topic report that identifies or otherwise indicates the utterance cluster(s) or utterances categorized in that topic. The report may include representation(s) such as one or more lists or tables for one or more of the topics. In addition, the report may include a visual representation such as a graph or chart. The report may be generated using the scores in the matrix H and/or matrix W.

For example, the system may use the matrix W to generate, for each of the k topics, a list of the exchanges to which the topic is pertinent. In addition, the system may sort the list according to the scores of the matrix W so that the pertinence of the topic to the exchanges is ranked from highest to lowest, or vice versa. In addition, the report may further include the score for each exchange so that a user viewing the list may ascertain the relevance of the topic to the particular exchange.

As another example, the system may use the matrix H to generate, for each of the k topics, a report that includes a list of the utterances or clusters to which the topic is pertinent. For example, an entry in the list may include an utterance that is representative of a corresponding cluster. Alternatively, all of the utterances within a particular cluster may be identified from the corresponding utterance cluster. The system may sort the list for a given topic according to the scores of the matrix H so that the pertinence of the topic to the clusters or individual utterances is ranked from highest to lowest, or vice versa. In addition, the report may further include the score for each utterance cluster or utterance so that a user viewing the list may ascertain the relevance of the topic to the utterance cluster or utterance. As described above, the utterances within a single cluster may be associated with the same score. The report may also include a count for each utterance cluster or utterance, where the count indicates the number of utterances in the corresponding cluster. Examples of such a report are described above with reference to FIGS. 5A and 5B. In this manner, the system may provide, for at least one of the topics, the corresponding subset of the plurality of utterances to which the topic is pertinent or a representation thereof.

In some implementations, the system may further provide access to a list of utterances within each cluster. This enables an administrator to cross-reference topics with the pertinent utterances.

As discussed above, each utterance subset can include or reference utterances corresponding to one or more utterance clusters. More particularly, since utterances within a given cluster have the same or similar meaning, they may also be assigned the same relevance score. Thus, topic relevance may be determined on a per-cluster basis.

After the utterance subsets have been generated and provided, each of the utterance subsets may be labeled with a topic based, at least in part, on the corresponding subset of the plurality of utterances. In some implementations, the subsets of the utterances may initially be provided without corresponding labels. A user may subsequently assign a topic label (e.g., alphanumeric name) representing the corresponding subset of the utterances to the corresponding utterance subset. For example, the user may review the utterances within each utterance subset and assign topic labels such as Damaged Item or Missing Item to the respective utterance subsets, as shown in FIGS. 5A and 5B. Alternatively, the system may auto-assign a topic label to each of the utterance subsets. For example, the system may process a particular utterance subset by identifying commonalities among utterances within the utterance subset. This may be accomplished using mechanisms such as natural language processing, computer-generated models, artificial intelligence, and/or pattern matching.

In the above-described examples, utterances generated by a single entity (e.g., agent entity) common to the exchanges are processed without processing utterances that are received by that entity (e.g., generated by other entities that are parties to the exchanges). However, these examples are merely illustrative. Therefore, in other implementations, utterances generated by any number of entities that are party to the exchanges may be processed.

Furthermore, in the above-described examples, the term "agent" is used to refer to the entity for which utterances are processed. While the term agent may refer to the same individual, the term agent may also refer to a particular role that may be fulfilled by one or more individuals and/or system processes. Therefore, the utterances that are processed may be generated by a human, system, process, or any combination thereof.

A user such as a chat bot designer may use a dialogue processing system such as that described above to generate state flows and/or identify topics using transcripts of exchanges. The chat bot designer may then use the state flows (e.g., a sequence of states and the subset of utterances representing each of the states) and/or topics to design, generate and/or test a chat bot. For example, a chat bot may be designed or generated so that it is configured to follow the same sequence of states, and generate and transmit one or more utterances selected from the corresponding representative utterance subset for each of the states. As another example, a chat bot may be designed and generated so that it pertains to one or more identified topics. The chat bot may be configured to generate and transmit one or more utterances from the utterance subset corresponding to the topic. While the examples described above pertain to a customer service context, these examples are merely illustrative. Therefore, the disclosed implementations may facilitate the design and/or testing of a chat bot in variety of contexts.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
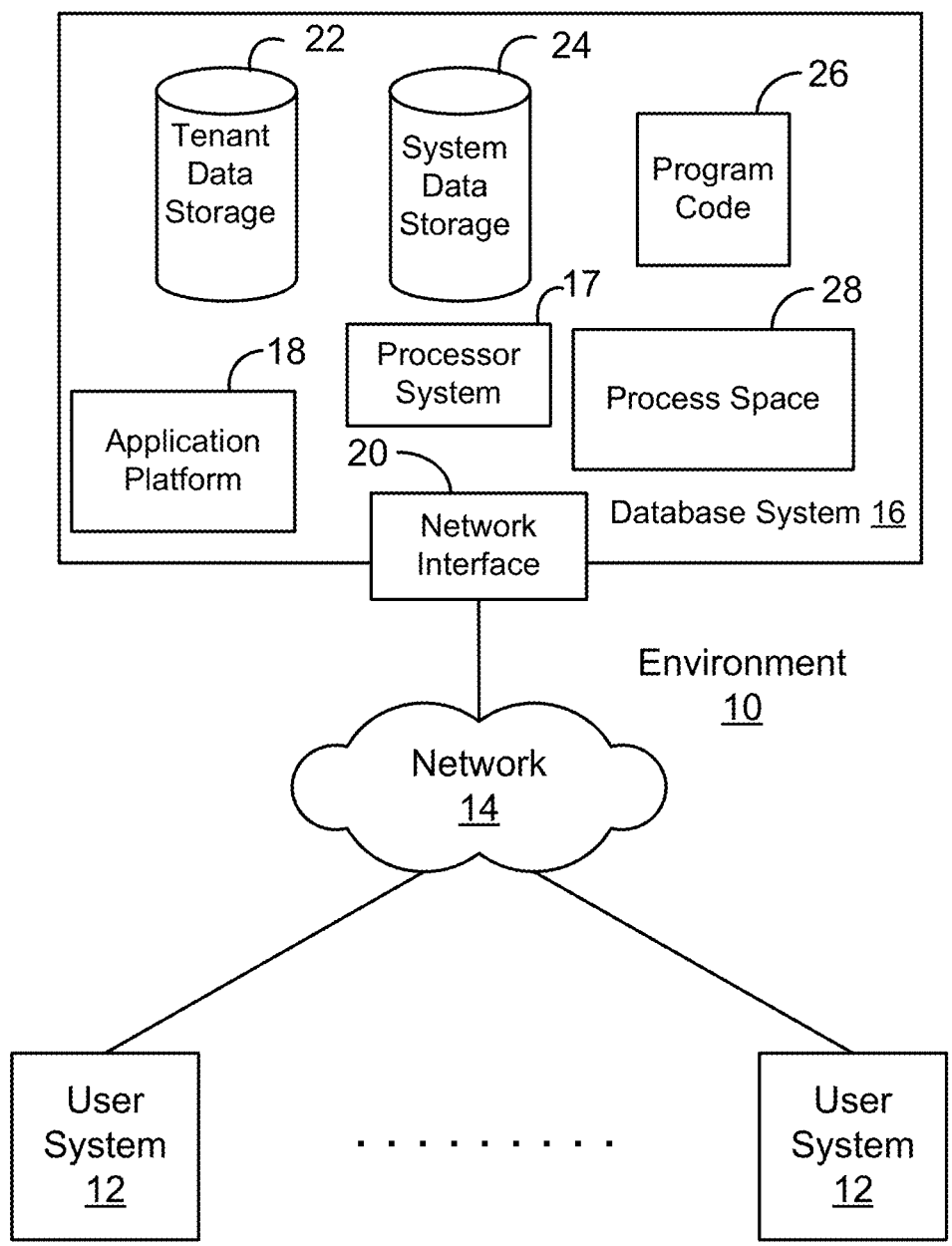
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
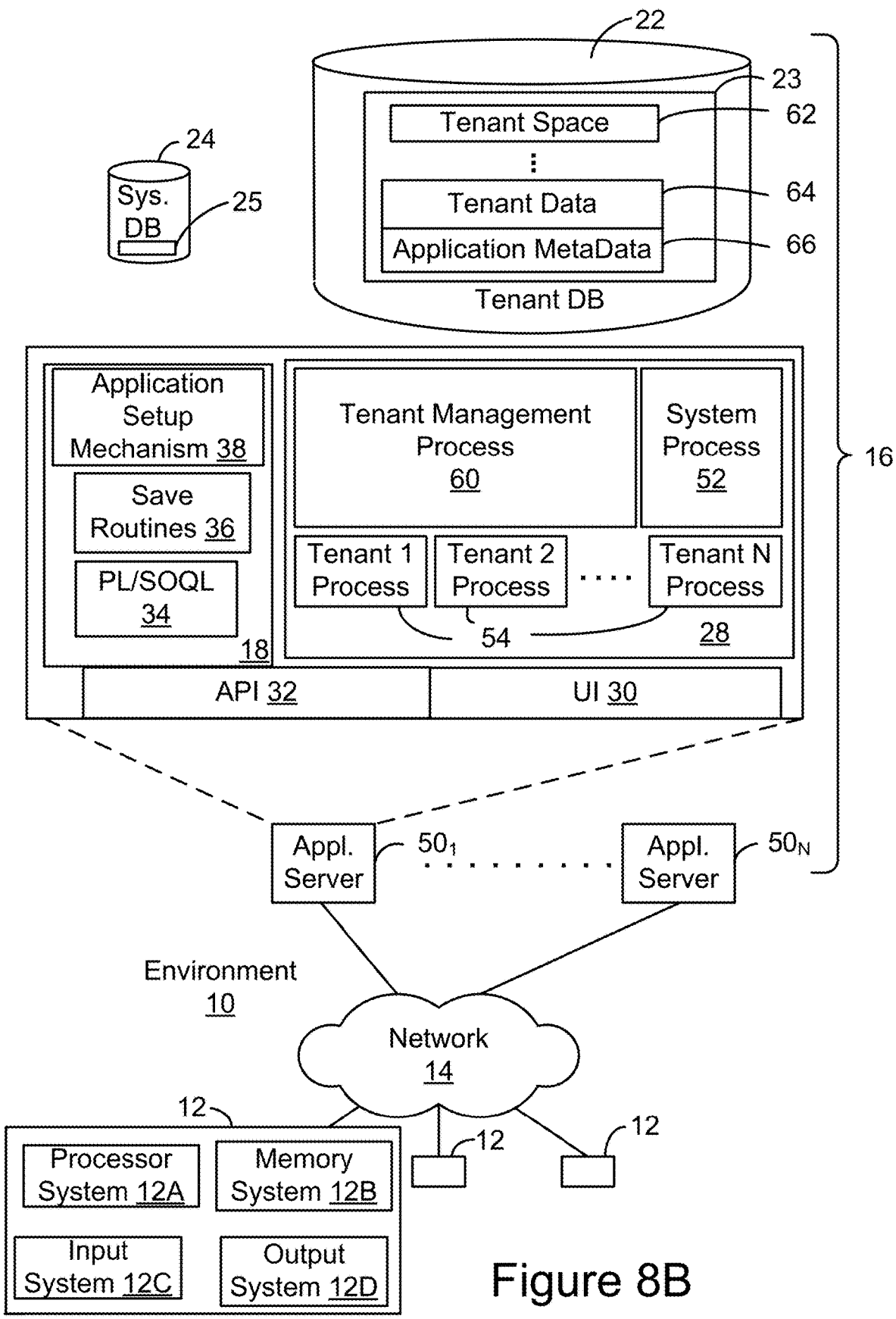
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
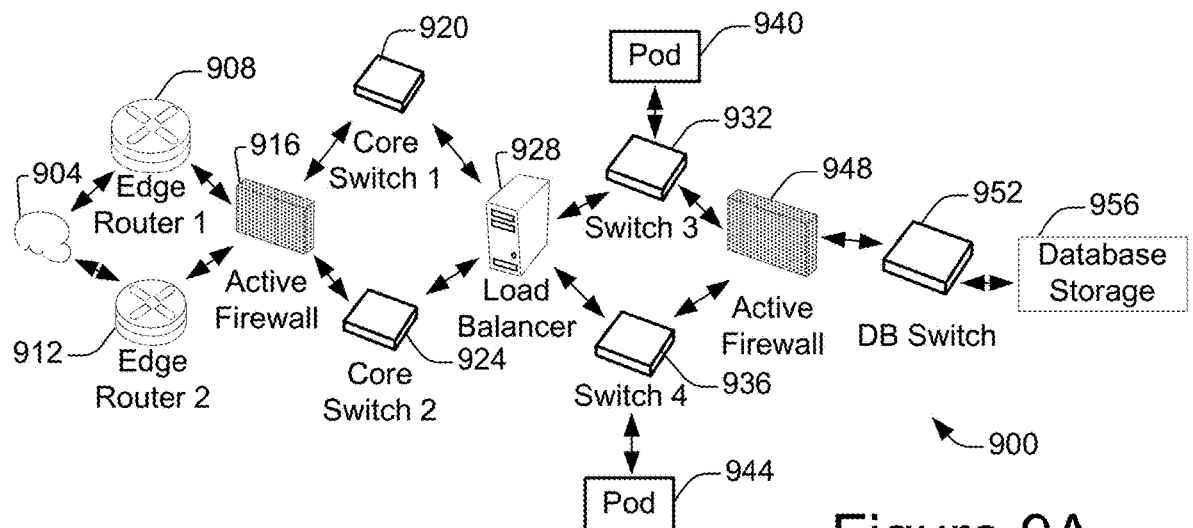
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
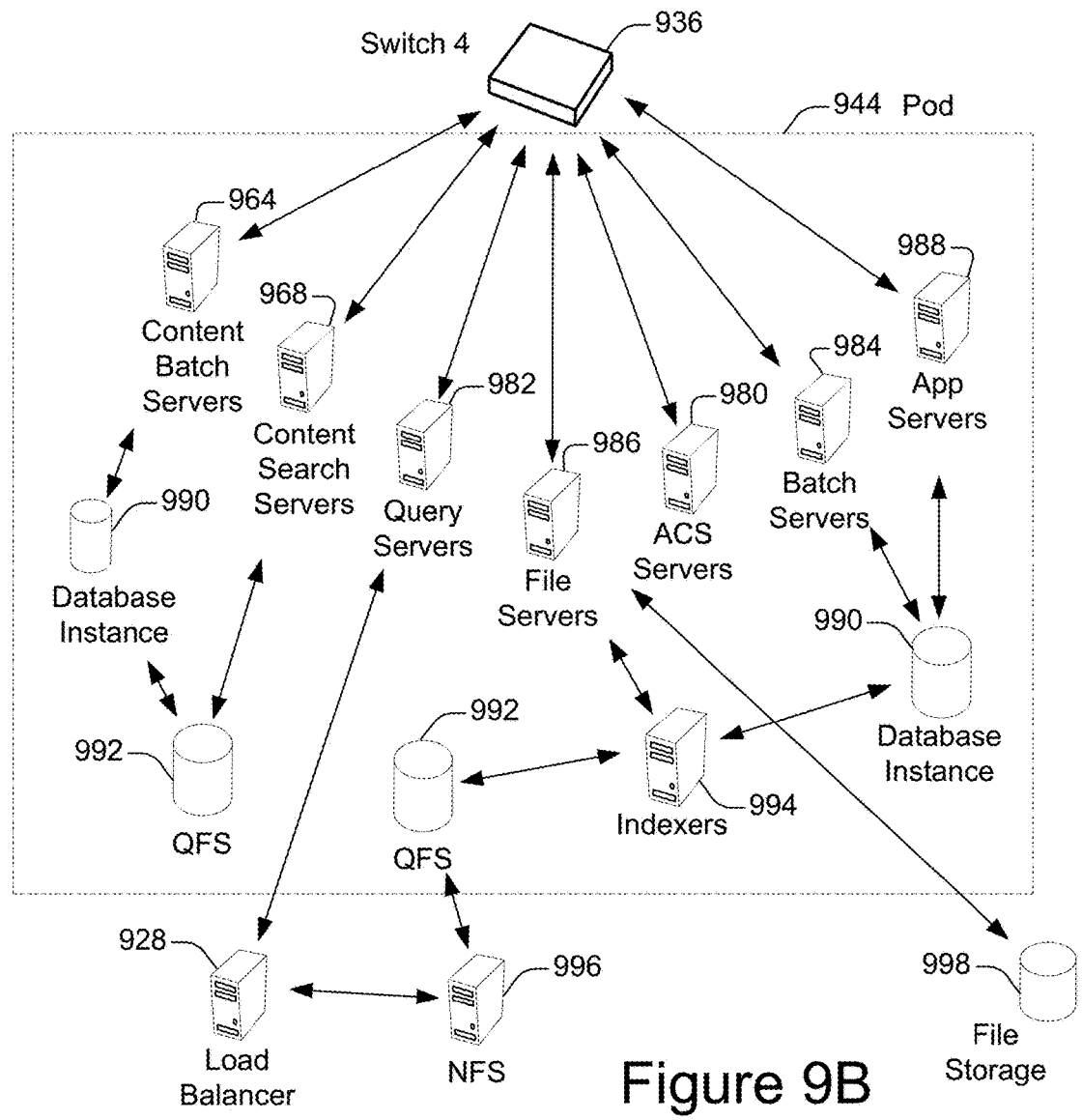
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM)

devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
for each utterance of a plurality of utterances within a plurality of exchanges, assigning a corresponding vector representation to the utterance;
clustering the plurality of utterances into a plurality of clusters based, at least in part, on the corresponding vector representations;
assigning, to each cluster of the plurality of clusters, a corresponding different label of a plurality of labels such that utterances within the cluster are associated with the corresponding label;
for each exchange of the plurality of exchanges, generating a corresponding sequence of labels representing a corresponding sequence of utterances based, at least in part, on the labels assigned to the plurality of clusters such that a plurality of exchange label sequences are generated; and
generating one or more subsets of the plurality of utterances using the exchange label sequences, each subset of the plurality of utterances corresponding to a particular topic.

2. The system as recited in claim 1, wherein generating the one or more subsets of the plurality of utterances comprises:
generating a matrix representing the exchanges using the plurality of exchange label sequences; and
factorizing the matrix such that each topic is represented by a corresponding subset of the plurality of utterances.

3. The system as recited in claim 2, wherein the matrix is a n×m matrix M, where n represents a quantity of exchanges in the plurality of exchanges and m represents a quantity of clusters in the plurality of clusters.

4. The system as recited in claim 2, wherein factorizing the matrix is performed using non-negative matrix factorization.

5. The system as recited in claim 2, wherein factorizing the matrix comprises:
generating a first matrix and a second matrix;
the database system further configurable to cause:
generating the one or more subsets of the plurality of utterances based, at least in part, on values in the second matrix.

6. The system as recited in claim 5, the database system further configurable to cause:
sorting, for each topic, the corresponding subset of the plurality of utterances based, at least in part, on values in the second matrix; and
for each topic, providing the sorted subset of the plurality of utterances.

7. The system as recited in claim 1, the database system further configurable to cause:
assigning a topic label to a subset of the plurality of utterances.

8. The system as recited in claim 7, the database system further configurable to cause:
generating or testing a chat bot using at least one of: the subset of the plurality of utterances or the topic label assigned to the subset of the plurality of utterances.

9. A method, comprising:
for each utterance of a plurality of utterances within a plurality of exchanges, assigning a corresponding vector representation to the utterance;
clustering the plurality of utterances into a plurality of clusters based, at least in part, on the corresponding vector representations;
assigning, to each cluster of the plurality of clusters, a corresponding different label of a plurality of labels such that utterances within the cluster are associated with the corresponding label;
for each exchange of the plurality of exchanges, generating a corresponding sequence of labels representing a corresponding sequence of utterances based, at least in part, on the labels assigned to the plurality of clusters such that a plurality of exchange label sequences are generated; and
generating one or more subsets of the plurality of utterances using the exchange label sequences, each subset of the plurality of utterances corresponding to a particular topic.

10. The method as recited in claim 9, wherein generating the one or more subsets of the plurality of utterances comprises:
generating a matrix representing the exchanges using the plurality of exchange label sequences; and
factorizing the matrix such that each topic is represented by a corresponding subset of the plurality of utterances.

11. The method as recited in claim 10, wherein the matrix is a n×m matrix M, where n represents a quantity of exchanges in the plurality of exchanges and m represents a quantity of clusters in the plurality of clusters.

12. The method as recited in claim 10, wherein factorizing the matrix is performed using non-negative matrix factorization.

13. The method as recited in claim 10, wherein factorizing the matrix comprises:
generating a first matrix and a second matrix;
the method further comprising:
generating the one or more subsets of the plurality of utterances based, at least in part, on values in the second matrix.

14. The method as recited in claim 9, further comprising:
assigning a topic label to a subset of the plurality of utterances.

15. The method as recited in claim 14, further comprising:
generating or testing a chat bot using at least one of: the subset of the plurality of utterances or the topic label assigned to the subset of the plurality of utterances.

16. A computer program product comprising computer-readable program code capable of being executed by one or more processors when retrieved from a non-transitory computer-readable medium, the program code comprising computer-readable instructions configurable to cause:
for each utterance of a plurality of utterances within a plurality of exchanges, assigning a corresponding vector representation to the utterance;
clustering the plurality of utterances into a plurality of clusters based, at least in part, on the corresponding vector representations;
assigning, to each cluster of the plurality of clusters, a corresponding different label of a plurality of labels such that utterances within the cluster are associated with the corresponding label;
for each exchange of the plurality of exchanges, generating a corresponding sequence of labels representing a corresponding sequence of utterances based, at least in part, on the labels assigned to the plurality of clusters such that a plurality of exchange label sequences are generated; and
generating one or more subsets of the plurality of utterances using the exchange label sequences, each subset of the plurality of utterances corresponding to a particular topic.

17. The computer program product as recited in claim 16, wherein generating the one or more subsets of the plurality of utterances comprises:
generating a matrix representing the exchanges using the plurality of exchange label sequences; and
factorizing the matrix such that each topic is represented by a corresponding subset of the plurality of utterances.

18. The computer program product as recited in claim 17, wherein the matrix is a n×m matrix M, where n represents a quantity of exchanges in the plurality of exchanges and m represents a quantity of clusters in the plurality of clusters.

19. The computer program product as recited in claim 16, the program code further comprising computer-readable instructions configurable to cause:
assigning a topic label to a subset of the plurality of utterances.

20. The computer program product as recited in claim 19, the program code further comprising computer-readable instructions configurable to cause:
generating or testing a chat bot using at least one of: the subset of the plurality of utterances or the topic label assigned to the subset of the plurality of utterances.

* * * * *